(12) United States Patent
Miller et al.

(10) Patent No.: US 10,486,060 B2
(45) Date of Patent: Nov. 26, 2019

(54) TRACKING CORE FOR PROVIDING INPUT TO PERIPHERALS IN MIXED REALITY ENVIRONMENTS

(71) Applicant: Microsoft Technology Licensing, LLC, Redmond, WA (US)

(72) Inventors: Quentin Simon Charles Miller, Sammamish, WA (US); Shawn Crispin Wright, Sammamish, WA (US); Jeffrey Alan Kohler, Redmond, WA (US); Blake Carlton Farmer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/678,031

(22) Filed: Aug. 15, 2017

(65) Prior Publication Data

US 2018/0140942 A1    May 24, 2018

Related U.S. Application Data

(60) Provisional application No. 62/426,019, filed on Nov. 23, 2016.

(51) Int. Cl.
| | | |
|---|---|---|
| *A63F 13/211* | (2014.01) |
| *A63F 13/235* | (2014.01) |
| *A63F 13/212* | (2014.01) |
| *G06F 3/01* | (2006.01) |
| *G02B 27/01* | (2006.01) |
| *G06F 3/0346* | (2013.01) |

(Continued)

(52) U.S. Cl.
CPC .......... *A63F 13/211* (2014.09); *A63F 13/212* (2014.09); *A63F 13/235* (2014.09); *A63F 13/25* (2014.09); *A63F 13/65* (2014.09); *A63F 13/837* (2014.09); *G02B 27/0093* (2013.01); *G02B 27/017* (2013.01); *G06F 3/011* (2013.01); *G06F 3/0346* (2013.01); *A63F 13/428* (2014.09)

(58) Field of Classification Search
None
See application file for complete search history.

(56) References Cited

U.S. PATENT DOCUMENTS

| | | | |
|---|---|---|---|
| 6,429,867 B1 * | 8/2002 | Deering | G06T 9/00 345/423 |
| 9,740,922 B2 * | 8/2017 | Csaszar | G06K 9/00355 |

(Continued)

OTHER PUBLICATIONS

"Mobile Processing Unit "Mpu-6d" With 6dof Tracking," https://inertiallabs.com/downloads/new/Inertial_Labs_MPU_6D_Datasheet_rev1.1_Jan2014.pdf, Published on: Jan. 2014, pp. 1-3.

(Continued)

*Primary Examiner* — Kevin Y Kim
(74) *Attorney, Agent, or Firm* — Arent Fox LLP

(57) ABSTRACT

Disclosed is a self-contained, pluggable tracking system that monitors six degree of freedom ("6DoF") without external apparatus, e.g., visual tracking or magnetic. The tracking core can communicate with a host device and with an external computing device. The external computing device can display a virtual ("VR") or augmented reality ("AR") world. The VR or AR world may be supplemented by overlay displays positioned according to the shape of the host device as tracked by the tracking core.

14 Claims, 14 Drawing Sheets

(51) Int. Cl.
    *G02B 27/00*     (2006.01)
    *A63F 13/25*     (2014.01)
    *A63F 13/837*     (2014.01)
    *A63F 13/65*     (2014.01)
    *A63F 13/428*     (2014.01)

(56) References Cited

U.S. PATENT DOCUMENTS

| | | |
|---|---|---|
| 2006/0176174 A1 | 8/2006 | Gollu et al. |
| 2008/0102919 A1 | 5/2008 | Rowe et al. |
| 2008/0285805 A1 | 11/2008 | Luinge et al. |
| 2010/0001998 A1 | 1/2010 | Mandella et al. |
| 2010/0325432 A1* | 12/2010 | Tang ................. G06F 21/85 713/168 |
| 2011/0213664 A1* | 9/2011 | Osterhout ............ G02B 27/017 705/14.58 |
| 2012/0262728 A1 | 10/2012 | Bridges et al. |
| 2012/0265479 A1 | 10/2012 | Bridges |
| 2013/0222565 A1 | 8/2013 | Guerin et al. |
| 2014/0286536 A1 | 9/2014 | Pettersson et al. |
| 2016/0195616 A1 | 7/2016 | Gilliland et al. |

OTHER PUBLICATIONS

"BMI055 Small, versatile 6DoF sensor module," http://www.mouser.com/ds/2/621/BST-BMI055-DS000-06-274900.pdf, Published on: May 29, 2013, pp. 1-148.

Mukherjee, Aritro, "Getting started with IMU (6 DOF) motion sensor," https://www.hackster.io/Aritro/getting-started-with-imu-6-dof-motion-sensor-96e066, Published on: Feb. 28, 2016, 7 pages.

* cited by examiner

TRACKING CORE FOR PROVIDING INPUT TO PERIPHERALS IN MIXED REALITY ENVIRONMENTS

CROSS-REFERENCE TO RELATED APPLICATION

This application claims the benefit of U.S. Provisional Application No. 62/426,019, filed on Nov. 23, 2016, which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to consumer electronic peripheral devices ("peripherals"), and more particularly, to sensors that provide input to virtual reality (VR) or augmented reality (AR) (also known as mixed reality (MR)) environments.

BACKGROUND

Six degrees of freedom ("6DoF") tracking can be useful in a wide variety of applications, e.g., MR headsets, 6DoF controllers, drones, human skeletal tracking, and toys. Often these systems incorporate a significant amount of external monitoring apparatus. These systems may use cameras or other similar optical sensors spaced around a bounded space that monitor a given subject. In some cases, the subject may be a wearable/mountable item, in others the subject may be a person. The external sensors track the person's or item's orientation and position within the bounded space. However, these systems require a significant amount of prior set up—that is, installing the sensors around and calibrating them to the bounded space. Further, the tracking device will not continue to operate properly if the user leaves the bounded space.

Components that track their own movement without external monitoring apparatus can be expensive (i.e., those that operate outside of a pre-calibrated bounded space). Consequently, integrating expensive components that track motion outside of an observed space into numerous peripheral devices of MR headsets substantially increases the system cost, which has an inverse correlation to adoption rate.

SUMMARY

Introduced here is a self-contained tracking core capable of positionally self-monitoring in 6DoF. The term "core," as usd herein, refers to a device that, in use, has been inserted into or mounted externally on another device ("host" device). The tracking core is suitable for use in conjunction with an MR device, among other things. The tracking core may be attached to any of various "dumb" or "smart" peripherals to an MR device, thereby adding functionality to the peripherals when used with the MR device.

Use of the tracking core involves physically mounting the tracking core into or onto a host device and detecting tracking data in 6DoF. The host device is a peripheral to an MR device. The tracking core establishes a communicative connection to the host device by which data may be passed back and forth. The tracking core receives a specification (data) from the host device. The specification identifies the host device as distinguished from other possible host devices. In some embodiments, the specification includes a set of physical dimensions and/or other parameters. The tracking core then wirelessly communicates both the tracking data and the specification to an MR device such as a head mounted display (HMD) device.

In some embodiments, an HMD device, having received a host device specification and tracking data for the tracking core, displays to a user of the HMD device a holographic image in a predetermined position relative to the host device when the host device changes position or orientation. The HMD displays the holographic image based on the spatial tracking data received from the tracking core and the known size/shape of the host device. A "holographic image" is a computer-generated image that the HMD device superimposes over the user's view of his/her surroundings. In some embodiments, the holographic image provides additional interactive elements, control schemes, or presents information to the user.

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

DETAILED DESCRIPTION

This disclosure is relates to self-contained tracking systems that monitor positions and orientations of objects in 6DoF without external apparatus, e.g., visual tracking or magnetic. The six degrees of freedom can be rotation about each of three orthogonal coordinate axes (i.e., pitch, roll, yaw about x, y and z axes, respectively) and translation along each of those axes. Making the 6DoF tracking system pluggable defrays user expense across multiple devices. A user, for example, might own a number of tracker modules and use them for different experiences, e.g., plugged into controllers for an MR experience, plugged into a drone, or plugged into a toy. The tracking system includes a tracking core that attaches to a host device (e.g., a peripheral) and that is able to communicate with the host device and with another computing device, such as an HMD device. The external computing device may display a VR or AR world to a user. The VR or AR world may be supplemented by overlay displays positioned according to the shape of the host device as tracked by the tracking core (e.g., a light saber "blade" may be added to a hilt host device, where the blade interacts with other holographic images or "objects").

Figure 1:
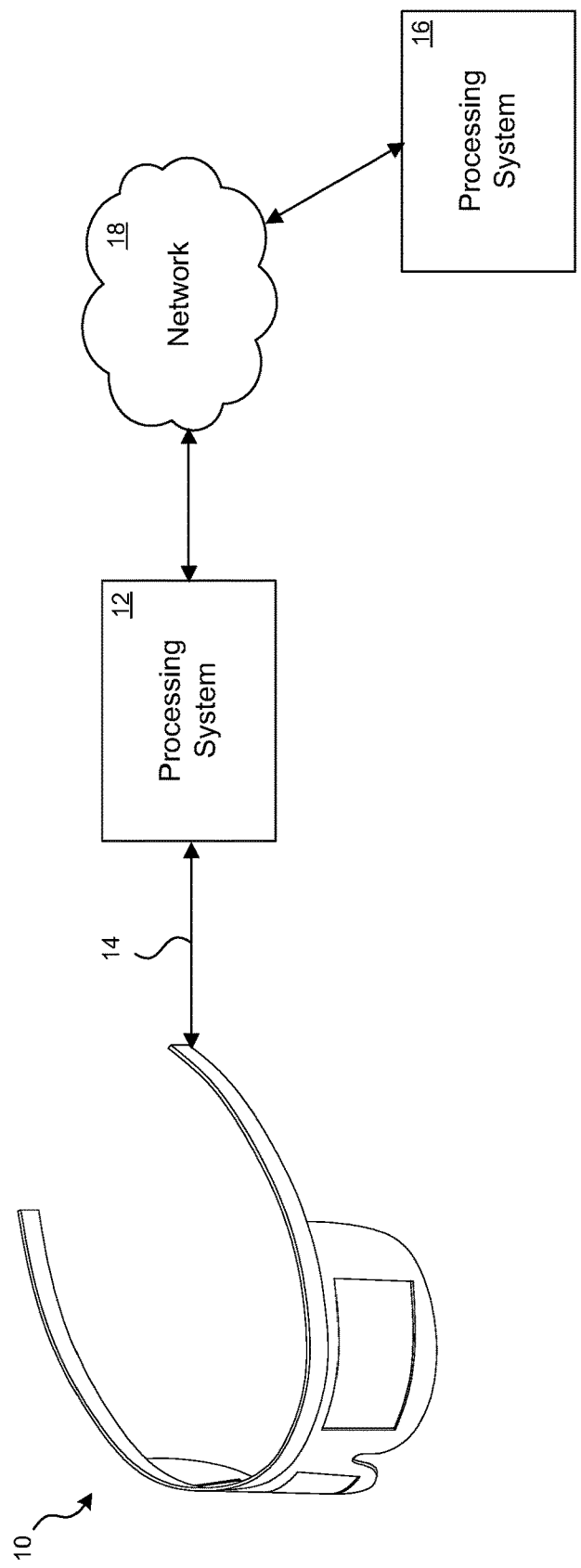
FIG. 1 illustrates an example of an environment including an HMD device.

FIG. 1 shows an example of an environment including a HMD device 10 that can implement the techniques introduced here. In the illustrated example, the HMD device 10 is configured to communicate data to and from an external processing device 12 through a connection 14, which can be a wired connection, a wireless connection, or a combination thereof. In other use cases, however, the HMD device 10 may operate as a standalone device. The connection 14 can be configured to carry any kind of data, such as image data (e.g., still images and/or full-motion video, including 2D and 3D images), audio data (including voice), multimedia, and/or any other type(s) of data. The processing device 12 may be, for example, a tracking device, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, DSL connection, cellular connection (e.g., 3G, LTE/4G or 5G), or the like, or a combination thereof. Additionally, the processing device 12 may communicate with one or more other processing systems 16 via a network 18, which may be or include, for example, a local area network (LAN), a wide area network (WAN), an intranet, a metropolitan area network (MAN), the global Internet, or a combination thereof.

Figure 2:
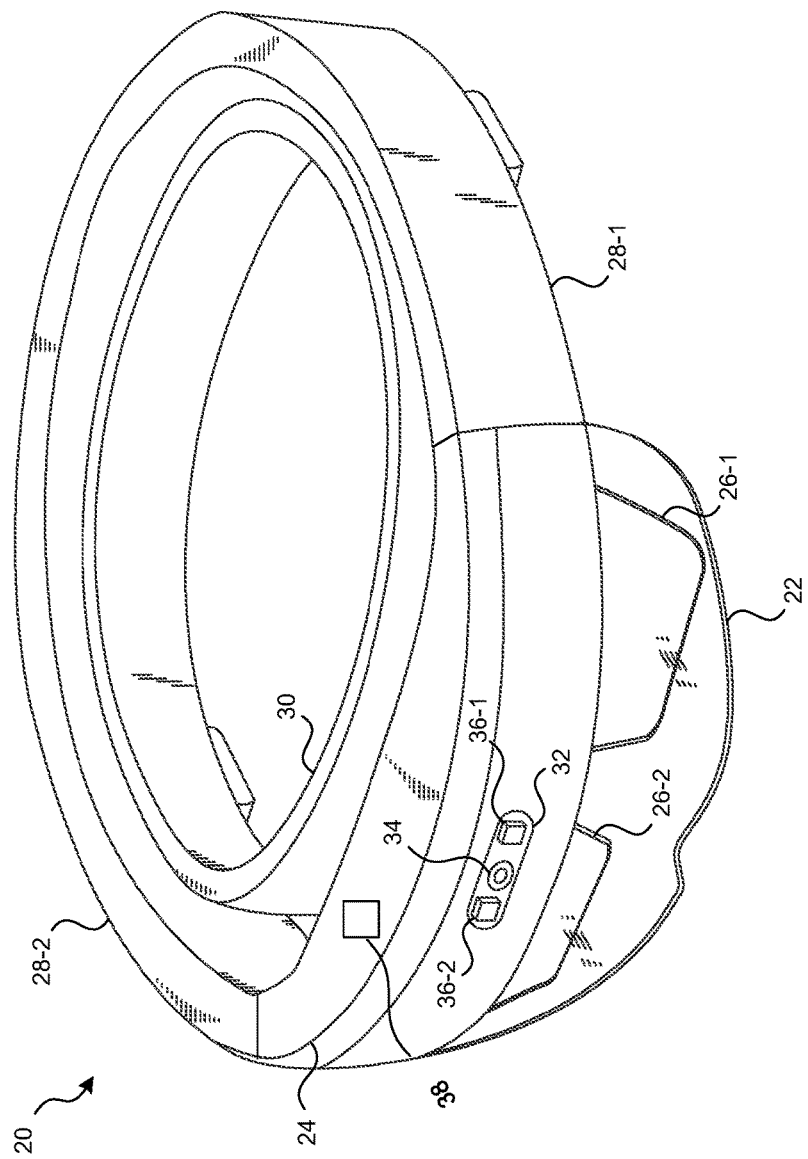
FIG. 2 shows a perspective view of an example of an HMD device.

FIG. 2 shows a perspective view of an HMD device 20 that can incorporate the features being introduced here, according to certain embodiments. The HMD device 20 can be an embodiment of the HMD device 10 of FIG. 1. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which a sensor assembly 32 and other components can be attached. In some embodiments, the sensor assembly 32 is contained within the visor assembly 22 and mounted to an interior surface of the chassis 24 via a lightweight metal frame (not shown). A circuit board (not shown in FIG. 2) bearing electronic components of the HMD 20 (e.g., microprocessor, memory) can also be mounted to the chassis 24 within the visor assembly 22.

The sensor assembly 32 includes a depth camera 34 and one or more associated illumination modules 36 (collectively referred to as illumination modules 36 and individually as illumination module 36-1 through 36-N) of a depth sensing system. The illumination modules 36 emit light to illuminate a nearby real-world environment. Some of the light reflects off surfaces of objects in the environment, and returns back to the depth camera 34. The depth camera 34 captures the reflected light that includes at least a portion of the light from the illumination modules 36.

The light emitted from the illumination modules 36 is electromagnetic radiation suitable for depth sensing and should not interfere with the user's view of the real world. As such, the light emitted from the illumination modules 36 is typically not part of the visible spectrum. Examples of the emitted light include infrared (IR) light to make the illumination unobtrusive. Sources of the light emitted by the illumination modules 36 may include LEDs such as superluminescent LEDs, laser diodes, or any other semiconductor-based light source with sufficient power output.

The depth camera 34 may be or include any image sensor configured to capture light emitted by the illumination modules 36. The depth camera 34 may include a lens that gathers reflected light and images the environment onto the image sensor.

The HMD device 20 includes a wireless communication device 38 for communicating with external peripherals. In some embodiments, the wireless communication device 38 is paired with an external peripheral such as a magnetic transmitter for monitoring positional 6DoF data from a given peripheral. The wireless communication device 38 may be a wireless transceiver that communicates in a suitable protocol known in the art (e.g., Wi-Fi, Bluetooth, RF, NFC, etc.).

The HMD device 20 includes electronics circuitry (not shown in FIG. 2) to control and synchronize the operations of the depth camera 34 and the illumination modules 36, and to perform associated data processing functions. The circuitry may include, for example, one or more processors and one or more memories. As a result, the HMD device 20 can provide surface reconstruction to model the user's environment, or be used as a sensor to receive human interaction information, such as hand-tracking information. With such a configuration, images generated by the HMD device 20 can be properly overlaid on the user's 3D view of the real world to provide a virtual or augmented reality. Note that in other embodiments the aforementioned components may be located in different locations on the HMD device 20. Additionally, some embodiments may omit some of the aforementioned components and/or may include additional components not discussed above nor shown in FIG. 2.

Figure 3:
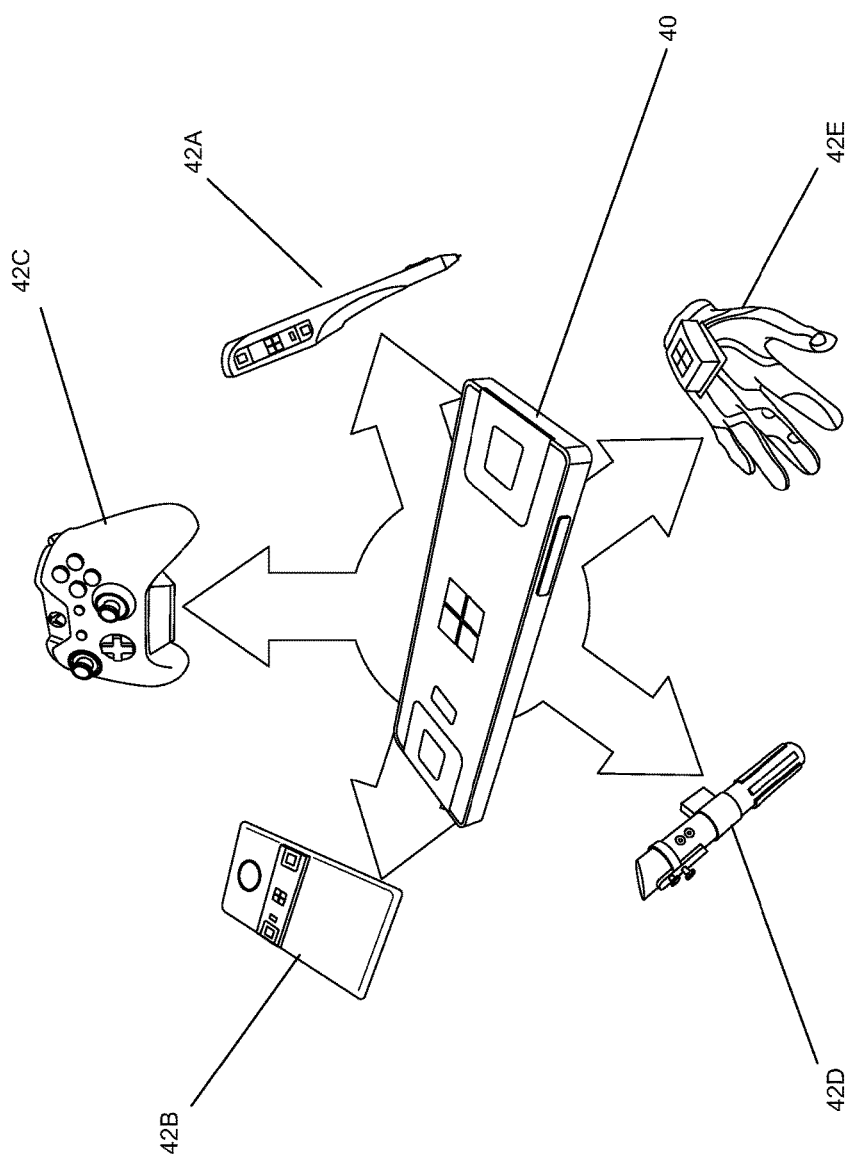
FIG. 3 is a depiction of a tracking core paired with depictions of peripherals with which the tracking core is communicatively connected.

FIG. 3 is a depiction of an input device such as a tracking core 40 paired with depictions of a number of peripheral items or host devices 42. The tracking core 40 communicatively connects with and mounts on a host device 42. The displayed embodiment of the input device 40 includes two optical sensors on either end. The input device 40 including a tracking core is one of the more expensive components for HMD device peripherals, thus separating the expensive component from peripherals individually reduces the cost of the peripherals The depicted host devices in FIG. 3 include a stylus/pen 42A, a smartphone 42B, a game controller 42C, a light saber 42D, and a tracking glove 42E. The tracking core 40 uses a conventional (e.g., standard based) connector such as universal serial bus (USB), or a proprietary connector to plug into each of the host devices. Each host device 42 has a matching connector, and in some embodiments includes a mechanical attachment port to physically secure the input device 40. The tracking core 40 may clip into place, for example, or magnetically attach to the host device 42. A communicative connection is established between the tracking core 40 and the host device 42 through one or more connectors. Other host devices 42 are suitable as well. An example of a host device 42 not pictured is a drone. Drones may additionally include a tracking core 40 for the purposes of providing additional functionality in MR environments.

Figure 4A:
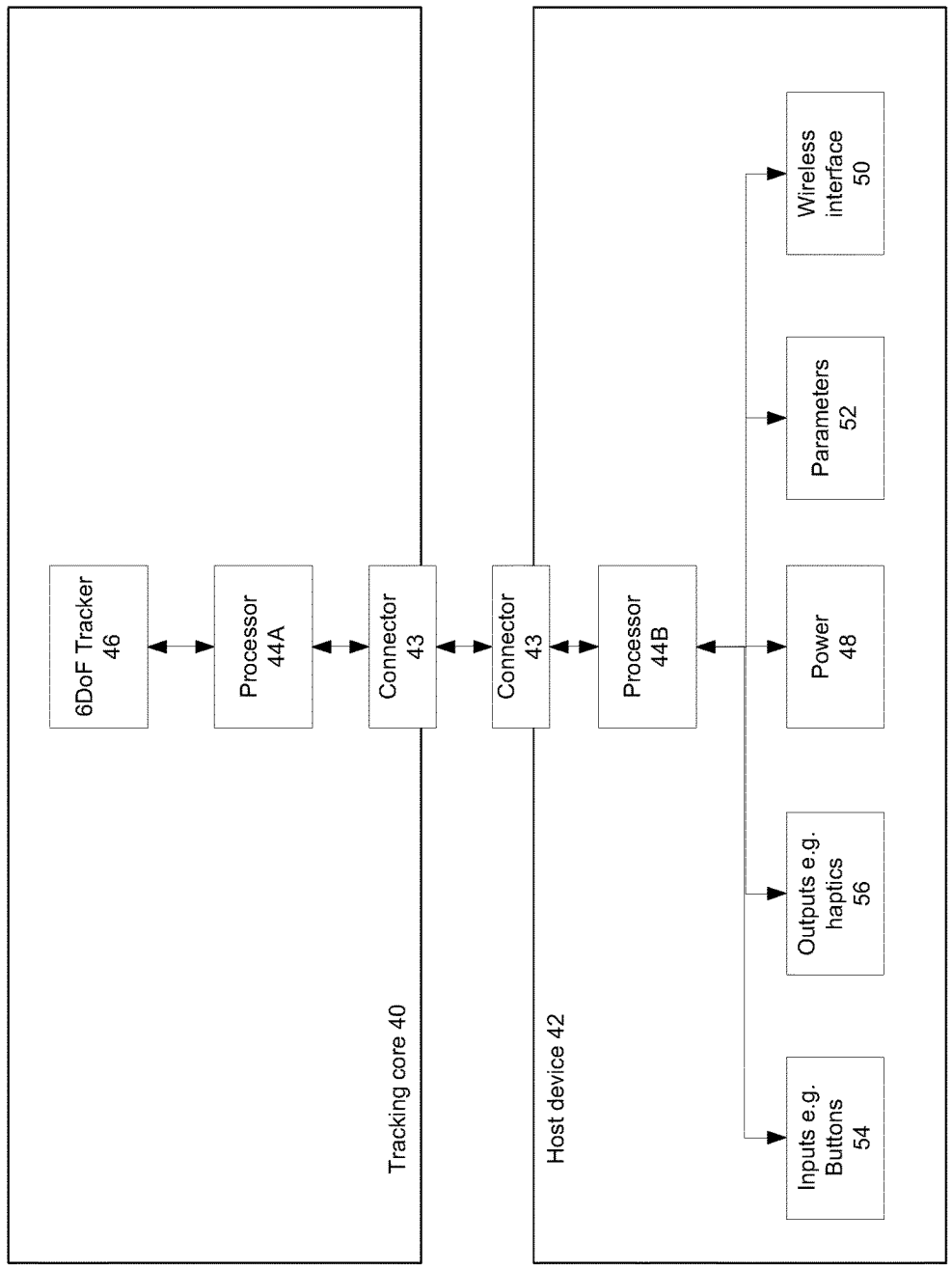
FIG. 4A is a block diagram of active components of a tracking core and a host peripheral.
Figure 4B:
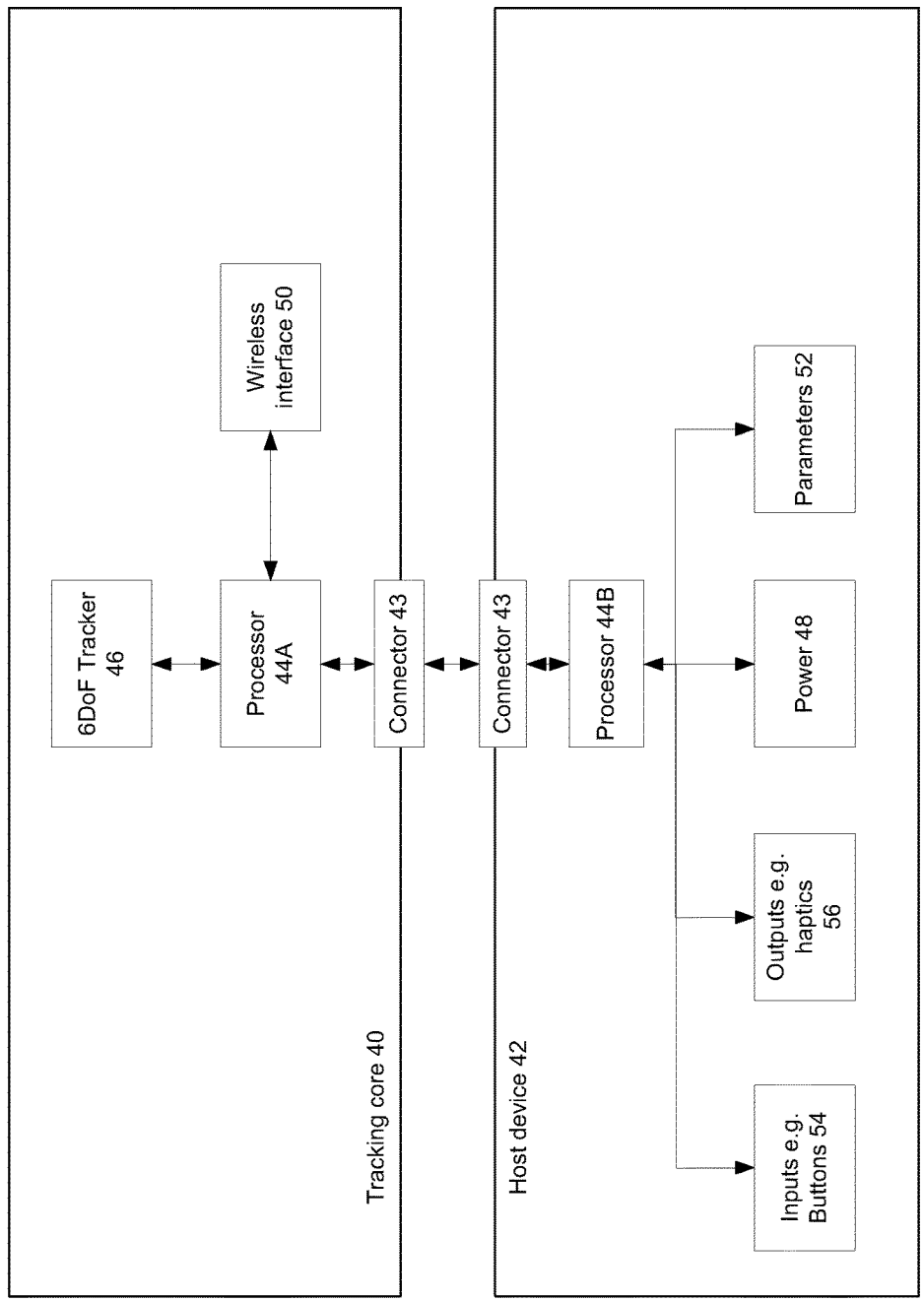
FIG. 4B is a block diagram of an alternate embodiment of active components of a tracking core and a host peripheral.

FIGS. 4A and 4B are block diagrams showing certain components of a tracking core 40 and a host device 42 according to some embodiments. The tracking core 40 is attached to the host device 42 to supplement functionality of the host device 42. The tracking core 40 is communicatively connected to the host device via a pair of connectors 43. The connection may be wireless (e.g., Wi-Fi, Bluetooth, near field, etc.), and/or physical (e.g., USB, Lightning, proprietary connector, etc.). In addition, the tracking core 40, the host device 42, or both devices 40, 42 communicate with a computing device such as an HMD device 20 of a virtual reality (VR) or augmented reality (AR) experience.

The tracking core 40 includes a processor 44A and a 6DoF tracker system 46. The 6DoF tracker 46 may be a self-contained tracking system. For example, a self-contained system may include a visual tracking system, an inertial measurement unit ("IMU"), a magnetometer, one or more cameras, or any combination thereof. Alternatively, the 6DoF tracker 46 may be only a portion of a complete tracking system. For example, such portion of a tracking system may include a magnetic transmitter. The magnetic transmitting communicates with an external receiver (element 38 of FIG. 2) mounted in a HMD device 20, the other half of the system. HMD device 20 interprets changes in the magnetic field transmitted by the magnetic transmitter as 6DoF tracking data. External cameras enable fully independent tracking of the tracking core 40 whereas a magnetometer will track within approximately one meter of the HMD device 20.

Embodiments of the host device 42 may include a processor 44B, a power source 48, a wireless interface 50, a specification file/parameters 52, and various input systems 54 and output systems 56. The specification file 50 is metadata about the host device. Examples of a specification file 52 include an identifier (ID) of the device, for example, "DISNEY DARTH VADER light saber model 1", physical dimensions of the device, the mechanical engineering of the device (in particular the location of the tracker module), visual rendering of the device, input and output options. This data may be used by a connected system, for example, HMD device 20, to render an image of the host device 42 in virtual space. The specification file 52 may also be used to download platform specific drivers to the HMD device 20. The wireless interface 50 may communicate 6DoF data, inputs, outputs and host device metadata to connected systems, for example, an HMD device 20.

Where the tracking core 40 communicates with the HMD device 20, the tracking core 40 reads the specification file 52 and transmits the specification 52 to the HMD device 20. In this way, the tracking core identifies the host device 42 into which the tracking core 40 is plugged. Knowledge of the specifications of the particular host device 42 that the tracking core 40 is plugged into enables the HMD device 20 to display overlays (computer-generated images) based on the shape, position and/or orientation of the host device 42. These overlays can be superimposed on the user's view of the real world (i.e., as in AR) or a completely virtual environment. Overlays may be displayed so that they appear (to the user of HMD device 20) to extend from or to be on top of the host device 42 at particular locations on the host device 42. For example, a holographic light saber blade extending from the top end of a light saber hilt host device.

Alternatively, the overlays may appear to float in space at a fixed location with respect to the host device 42. Data from the tracking core 40 enables the HMD device 20 to move the overlays in unison with the host device 42, for example, such that the overlay appears joined or connected to the host device 42.

In embodiments where the host device 42 contains the wireless communicator 50, the host device 42 transmits to the HMD device 20 location tracking input, both angular and locational (6DoF) along with any other data that may be communicated between the combined peripheral 40, host device 42 and the HMD device 20.

Figure 5:
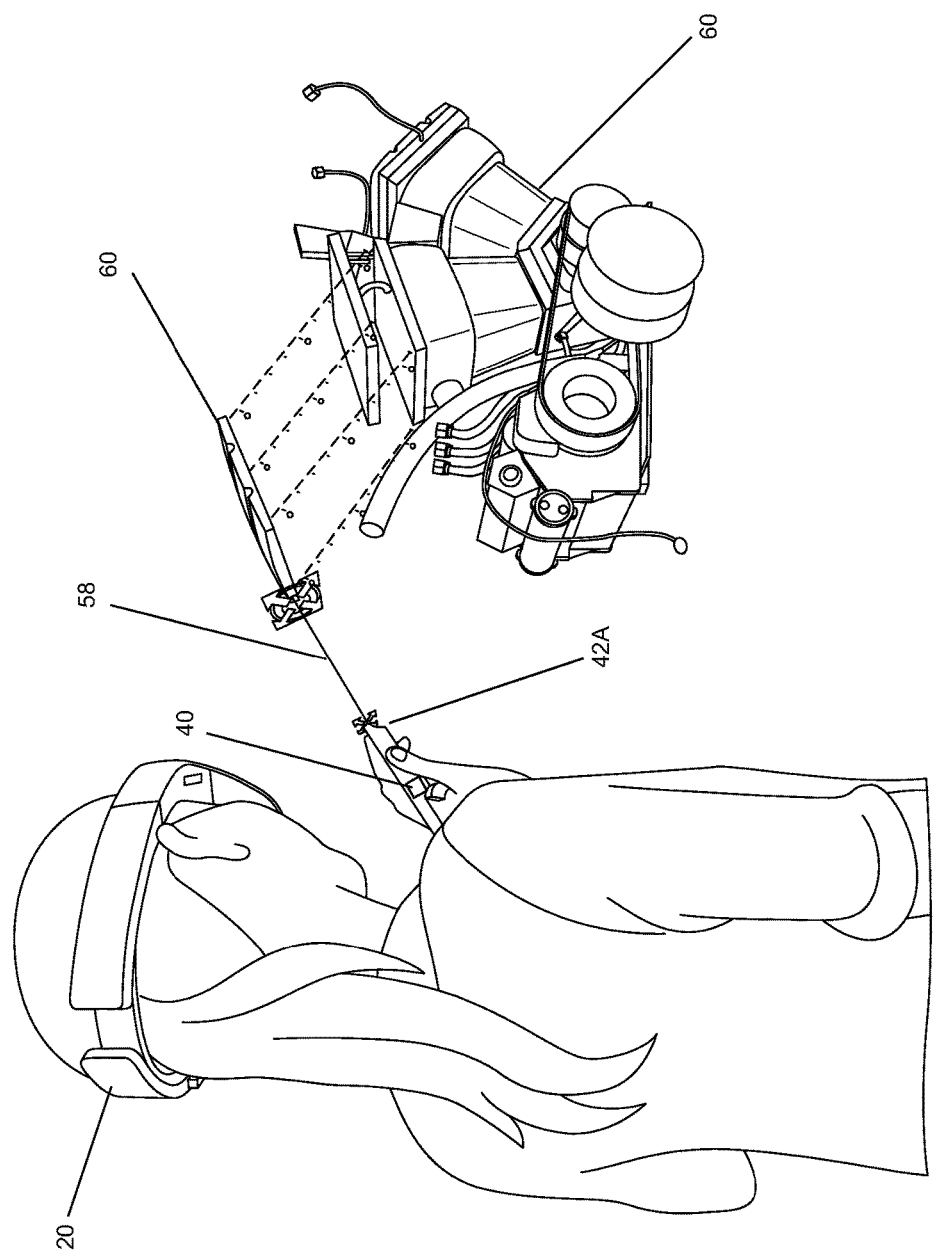
FIG. 5 is a depiction of the use of the tracking core paired with a stylus for object manipulation in a MR environment.

FIG. 5 is a depiction of the use of the tracking core 40 paired with a stylus host device 42A (hereafter the "stylus 42A") and in use for object manipulation in a MR environment. 6DoF tracking on a stylus 42A enables the HMD device 20 to project a digital image 58 (e.g., a holographic image added into the real world, or part of a wholly digitally rendered world) at a predetermined position relative to the host device 42, in this case a line/laser from the stylus 42A. The digital image 58 from the stylus 42A itself interacts with other digital constructs 60 (either virtual or holographic).

FIG. 5 illustrates digital constructs 60 including a holographic engine and a holographic engine component. The digital image 58 is a pointer beam or laser displayed on the HMD device 20 in response to user input 54 on the stylus 42A. The pointer beam 58 interacts with the holographic engine component enabling movement of the component. The pointer beam 58, when activated, appears at an established and fixed position relative to the stylus 42A. In this example, the fixed position is extending linearly from and parallel to the tip of the stylus 42A.

The stylus 42A used in conjunction with the tracking core 40 can be used for more accurate positional/orientation tracking of the stylus 42A as compared to external cameras or sensors designed to capture positional input of the stylus 42A. The tracking core 40 provides both positional (x,y,z) and orientation (roll, pitch, yaw) data, along with physical specifications of the stylus 42A to the HMD device 20. Using this data, the HMD device 20 is able to determine the location of the tip of the stylus 42A both accurately and precisely in order to display the pointer beam 58.

Figure 6:
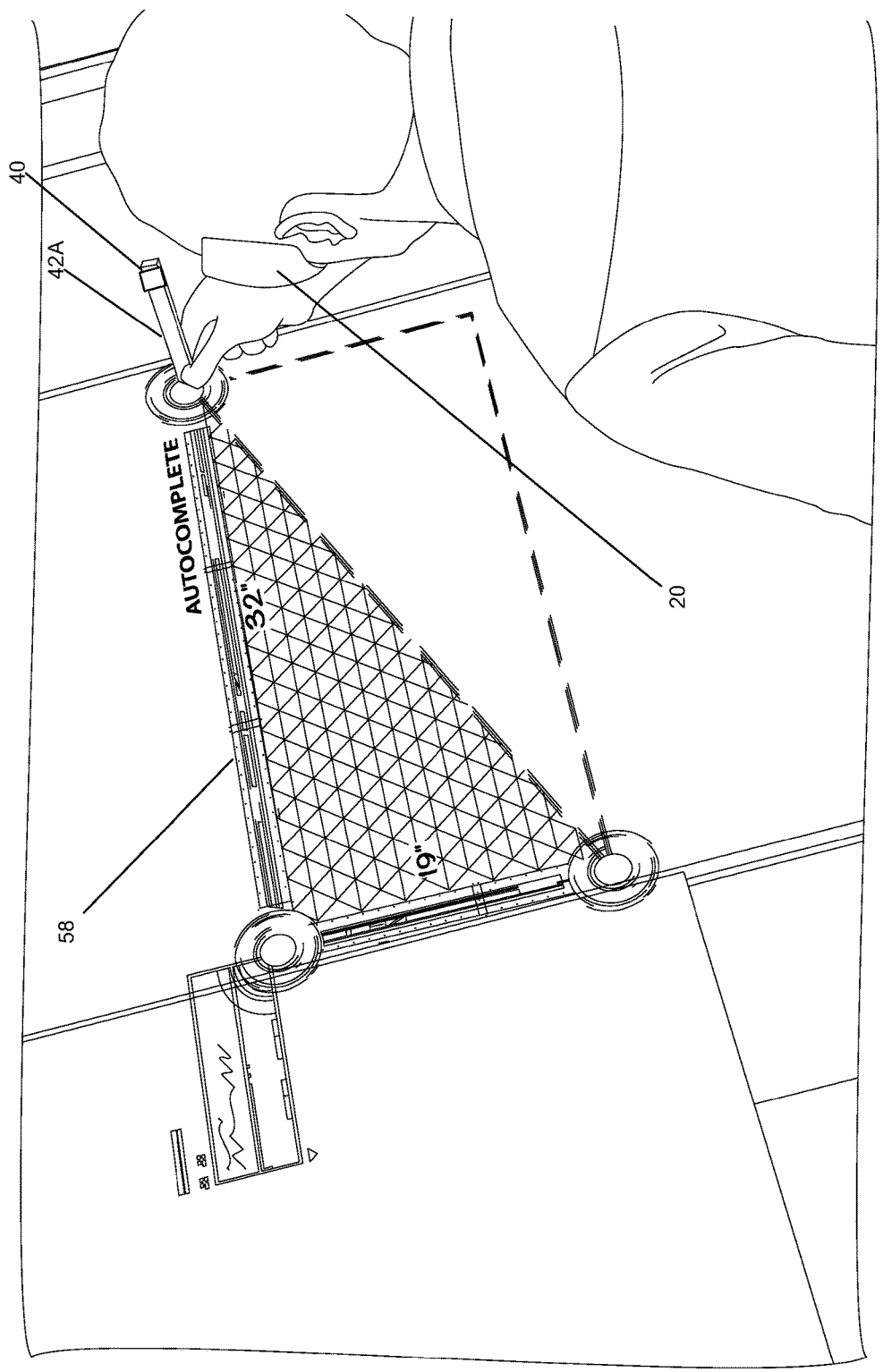
FIG. 6 is a depiction of the use of the tracking core paired with a stylus for drawing in a MR environment.

FIG. 6 is a depiction of the use of the input device paired with a stylus 42A and in use drawing in a VR or AR environment. A further use of a stylus 42A is as a drawing tool. When drawing using a tracking core 40, the output of the HMD device 20 may be the exact measurements generated by the tracking core 40. A human would not necessarily know how far they moved the stylus 42A with any reasonable precision. With an attached tracking core, the HMD device 20 is able to display precise measurements of the translation. Thus, the distances may be displayed on the HMD device 20. The described method enables the generation of schematics in both life-size and scaled-size.

Figure 7:
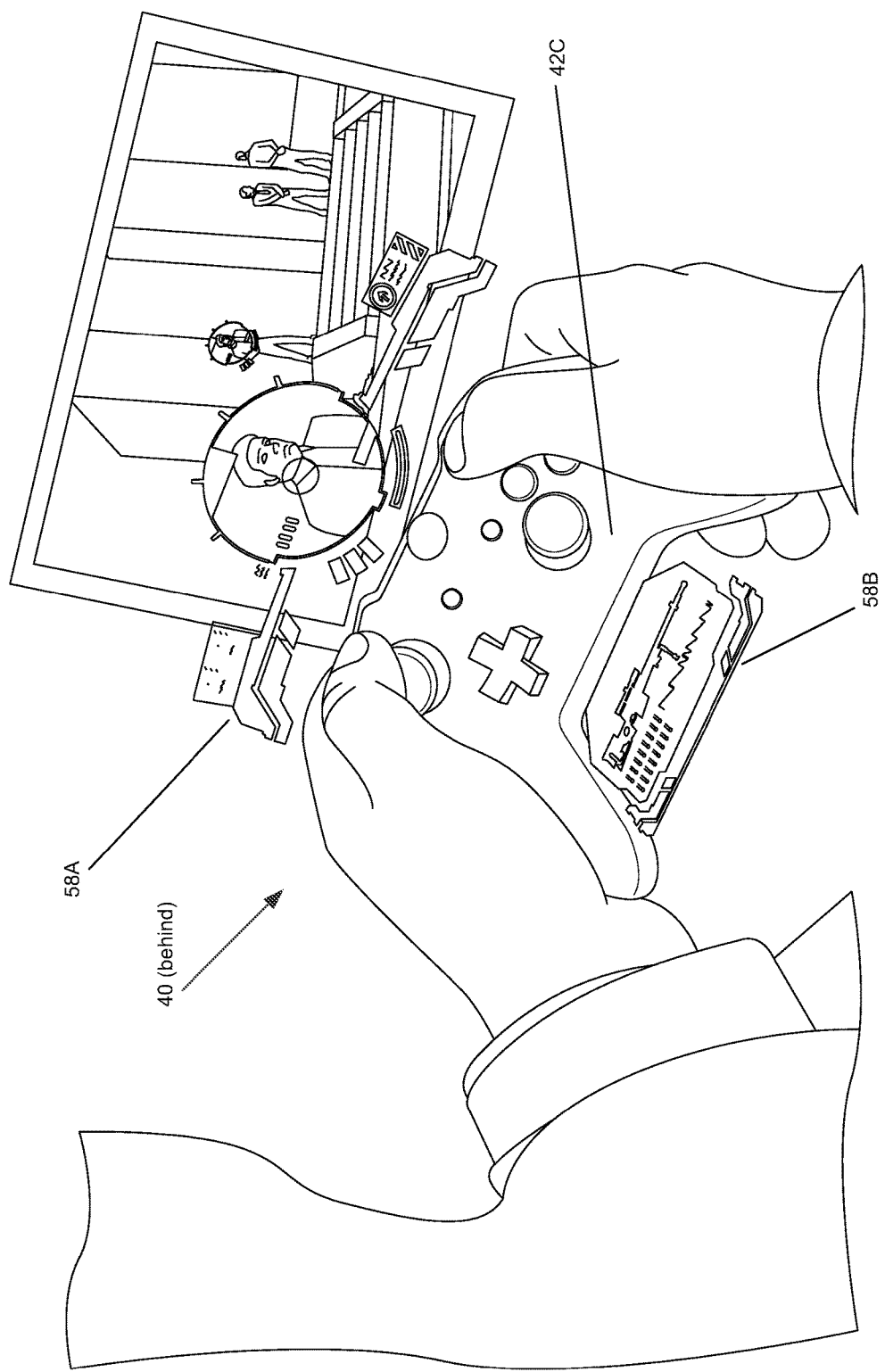
FIG. 7 is a depiction of the use of the tracking core paired with a game controller in a MR environment.

FIG. 7 is a depiction of the use of the input device paired with a game controller and in use in a VR or AR environment. FIG. 7 illustrates a similar principle as in FIGS. 5 and 6 implemented in a different way. In this example, the tracking core 40 is plugged into the back of a game controller host device 42C (hereafter the "game controller 42C"). The HMD device 20 receives exact positioning of the tracking core 40 on the game controller 42C. Based on a host device specification, the HMD device 20 has data describing the shape of the game controller 42C.

There are a number of ways for the HMD device 20 to know the shape of the game controller 42C. One example includes storing a file describing the host device 42 on the HMD device 20, and using the specification file 52 to direct which file the HMD device 20 loads. A second example involves using the specification file 52 alone to describe the host device 42. Thus, the specification file 52 is transmitted to the HMD device 20 and the HMD device 20 reads the specification file in order to obtain a description of the shape of the host device 42.

Overlays such as heads up displays may be placed on the controller. FIG. 7 illustrates the functionality that the tracking core 40 provides to a traditional "first person shooter" video game. A digital image 58A of a "sniper" gun scope is projected in a fixed position above the game controller 42C in an AR environment. Secondly, an additional digital image 58B, of the currently selected player weapon is fixed below the game controller 42C. Through the sniper scope 58A, the player is able to zoom in on the display of a game displayed on a nearby TV. The game console communicates with the HMD device 20 to provide the necessary graphics.

In use, this embodiment enables the user to both see a zoomed in perspective of their gun scope and see the surrounding display as if they had not been using their scope. This differs from the interface of many first person shooter video games where a user commonly uses either the zoomed scope view or the shooting-from-the-hip "natural view," not both simultaneously. In some embodiments, movement of the controller generates a corresponding movement of the aim of the user's gun (and view in the scope). This type of game controller movement provides a replacement or alternate control for functions more traditionally enabled through use of the right control stick. In other embodiments, the movement of the game controller 42C does not cause the viewfinder of the scope to aim in a different location (though the scope digital image 58A still matches the movement of the game controller 42C in order to appear in a fixed position).

Figure 8:
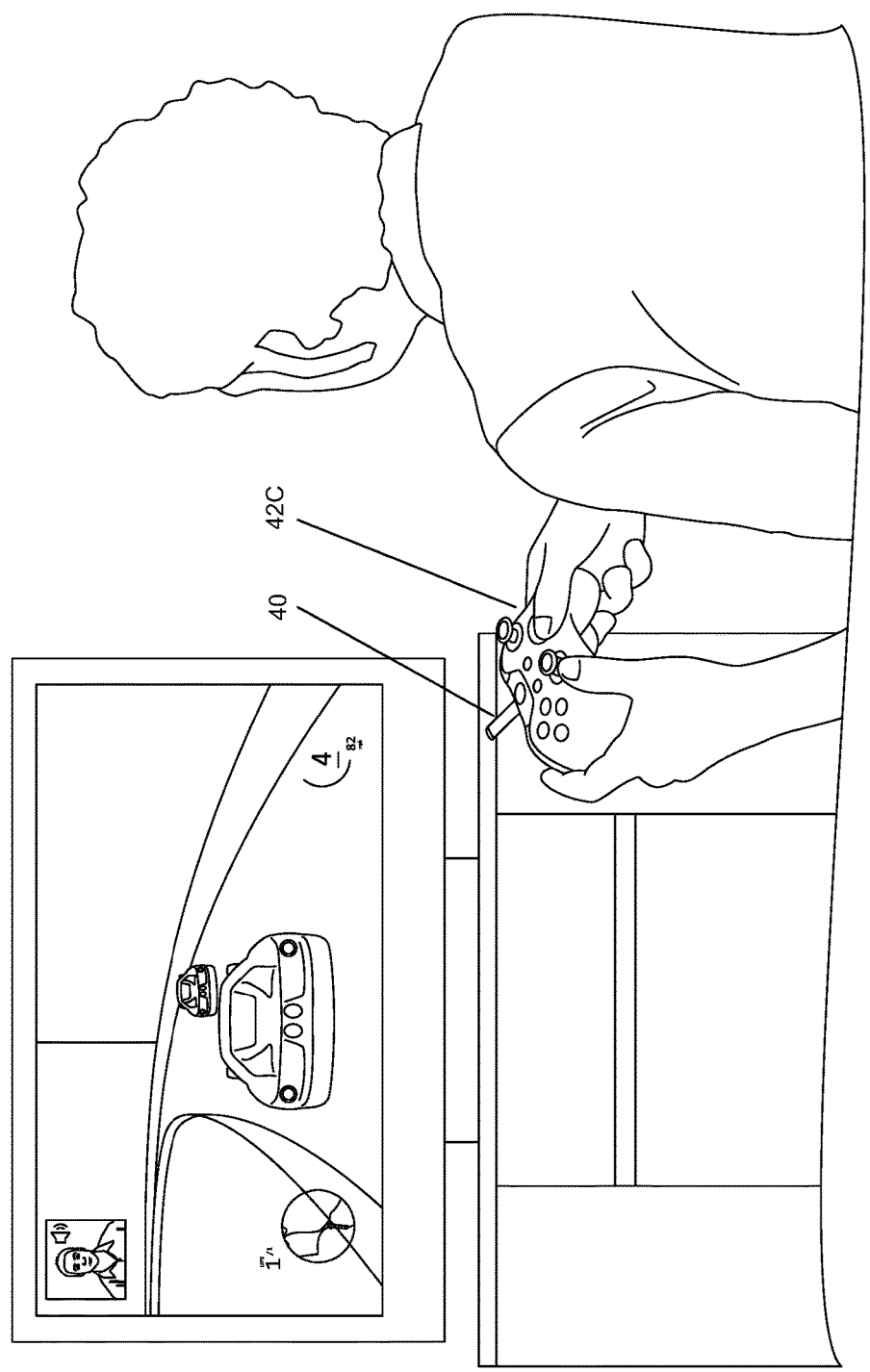
FIG. 8 is a depiction of the use of the tracking core paired with a game controller to provide additional controller functionality.

FIG. 8 is a depiction of the use of the tracking core 40 paired with a game controller 42C to provide supplemental controller functionality. In this example, the attached tracking core 40 imparts additional steering control input to the controller 42C. When the user turns (rolls) the controller 42C to the left or right, the game console interprets this user input as turning a car's steering wheel to the left or right respectively. This provides a supplemental function to controllers and game consoles that would otherwise not have this function. For example, standard XBOX or PlayStation controllers do not detect orientation; however, some games are designed with controller orientation based controls. This functionally removes the underlying hardware limitation with minimal expense to the consumer.

Figure 9:
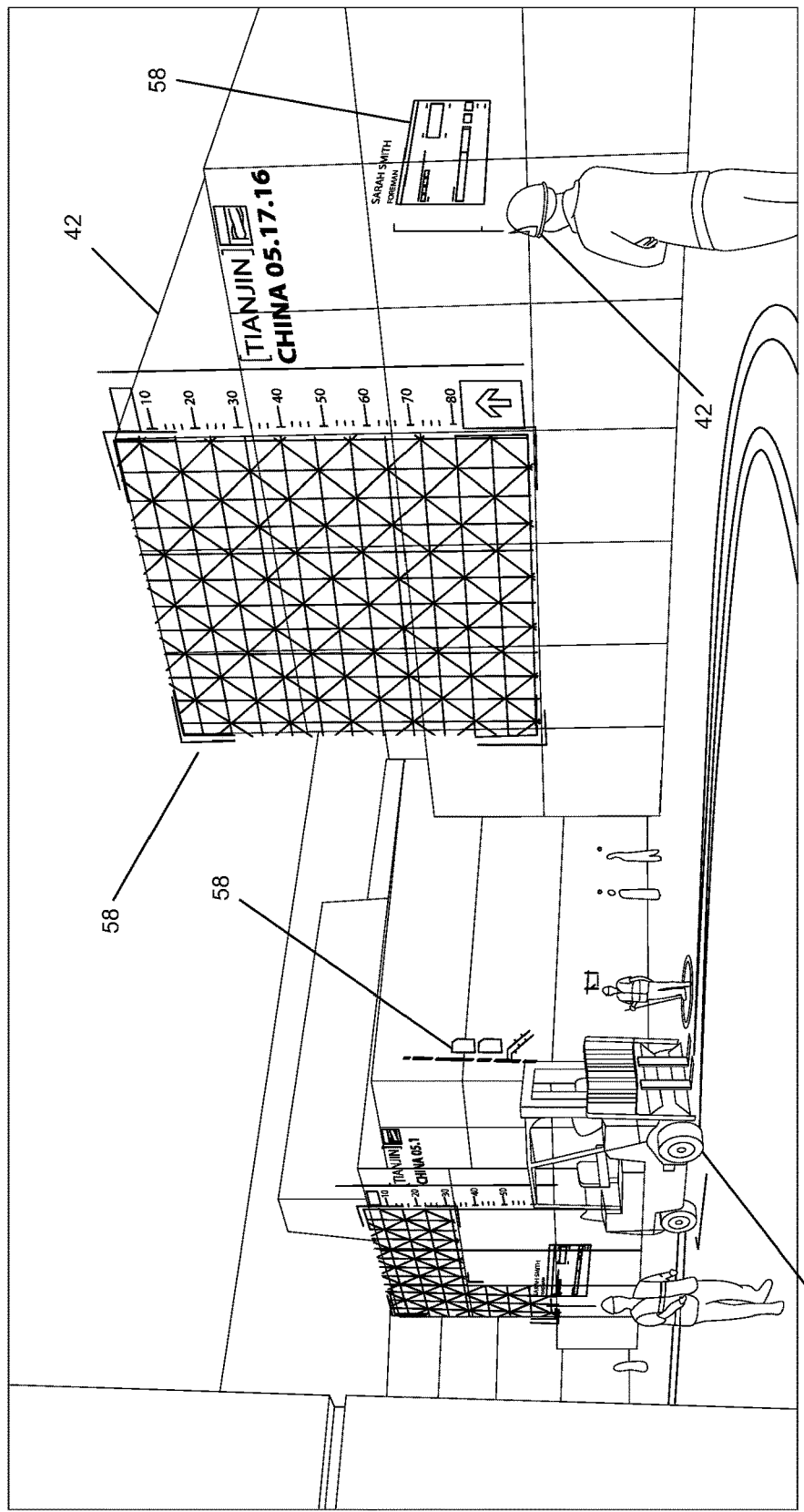
FIG. 9 is a depiction of the use of the tracking core used in a work site.

FIG. 9 is a depiction of the use of the tracking core 40 used in a work site. In this example, tracking cores 40 (not shown) are attached to a number of work site items for use as host devices 42. In some embodiments, the host device 42 is significantly larger than the tracking core 40, thus feasible locations for the placement of the tracking core 40 on the host device 42 are numerous. In practice, the tracking core 40 may be mounted at any secure location on the host device 42.

In this example, host devices 42 include "heavy equipment" such as crates, forklifts. The figure additional uses safety helmets as host devices. However, other heavy equipment such as mechanized tools, cranes, tractors, trucks, loaders, and other suitable warehouse, factory, or work site equipment known in the art may be used as host device 42. In this example, the tracking cores 42 enable a HMD device 20 to track people, machine, crates, and cargo through a warehouse, factory, or other suitable work site. Digital images 58 may be fixed to positions nearby the host device 42 and provides information about the subject host device 42. For example, in the case of a hard hat, the information provided by the digital image 58 may include who the person wearing the hat is, how long they have been on shift, or a schedule for that person. On a machine, the digital image 58 may include gas or other fluid levels for the machine. On a crate, the digital image 58 may describe cargo, or where the cargo is bound.

Some of these host devices 42 have known sizes, though are commonly "dumb" items that do not have logic of their own (e.g., a hard hat has minimal, if any, logic programming). The tracking core 40 is loaded with the necessary data concerning the size and shape of the host device. In some embodiments, each of the host devices 42 includes a tracking core mount that includes a specification 52 stored in a memory of the tracking core mount or a specification 52 identified through a barcode or other machine-readable code.

During use, the tracking core 40 may use onboard sensors, such as cameras to read a barcode on the tracking core mounts of the host devices 42. The barcode includes the specification data 52. The tracking core 40 transmits the specification data 52 to a nearby or paired HMD device 20. In some embodiments, the tracking core 40 is calibrated with host specifications before being plugged into the host device 42.

Figure 10:
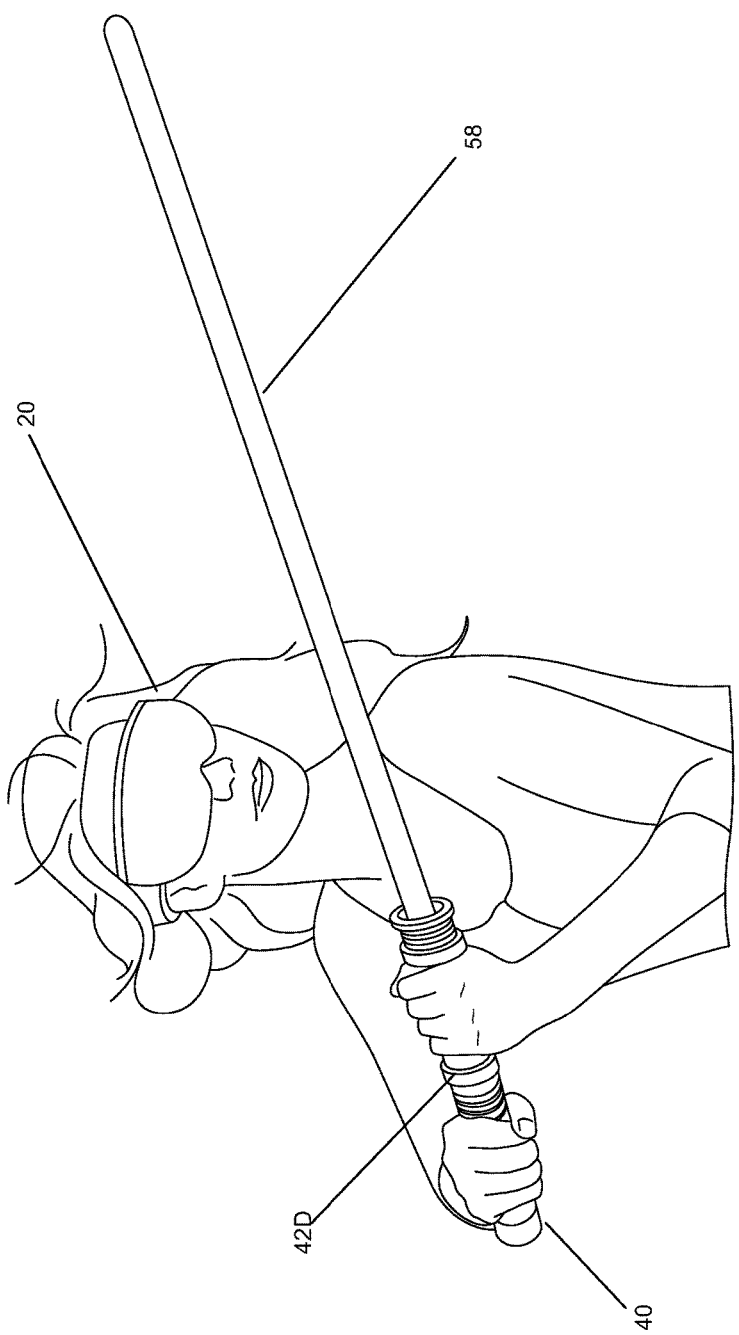
FIG. 10 is a depiction of the use of the tracking core paired with a host device that has a fictional, hologram-enabled function in a MR environment.

FIG. 10 is a depiction of the use of the tracking core 40 paired with a host device 42D that has a fictional, hologram-enabled function/purpose in use in a MR environment. The tracking core 40 may be inserted into host devices 42 that are based on popularized fiction. The example displayed here is that of a light saber hilt from Star Wars. Using the known size and position data of the light saber hilt, a MR environment generated by a HMD device 20 is can display a digital image 58 of an accurately positioned light saber blade. In the case of a virtual environment, the whole light saber is digitally created matching the positioning of the host device light saber hilt 42D. In the case of an augmented environment, the light saber blade 58 is added to the hilt 42D in the same manner as the pointer beam is added to the stylus in FIG. 5. The difference, in this case, is that the light saber blade 58 is used as an interactive element of a game.

Using the tracking core 40 in this manner enables realistic use of the pseudo-physics that pertain to the fictional weapon. The HMD device 20 is able to generate effects using the position of the digital light saber blade 58 and based on the positioning of the physical light saber hilt (host device) 42D via the plugged in tracking core 40. Thus, the light saber blade 58 may "exist" in a digital world even when the hilt 42D is not in view of the user. This is relevant for HMD devices 20 that perform only forward facing scene detection. In order to depict the fictional properties of the light saber accurately, the blade must exist outside of the user's field of view. For example, the user may skewer his or herself on the blade, swing the blade at enemies in their periphery, or perform spinning attacks. These same features apply to other embodiments of host devices 42 as well. Each host device 42 has associated physics, either real or fictional that may be mimicked by the digital image 58.

Figure 11:
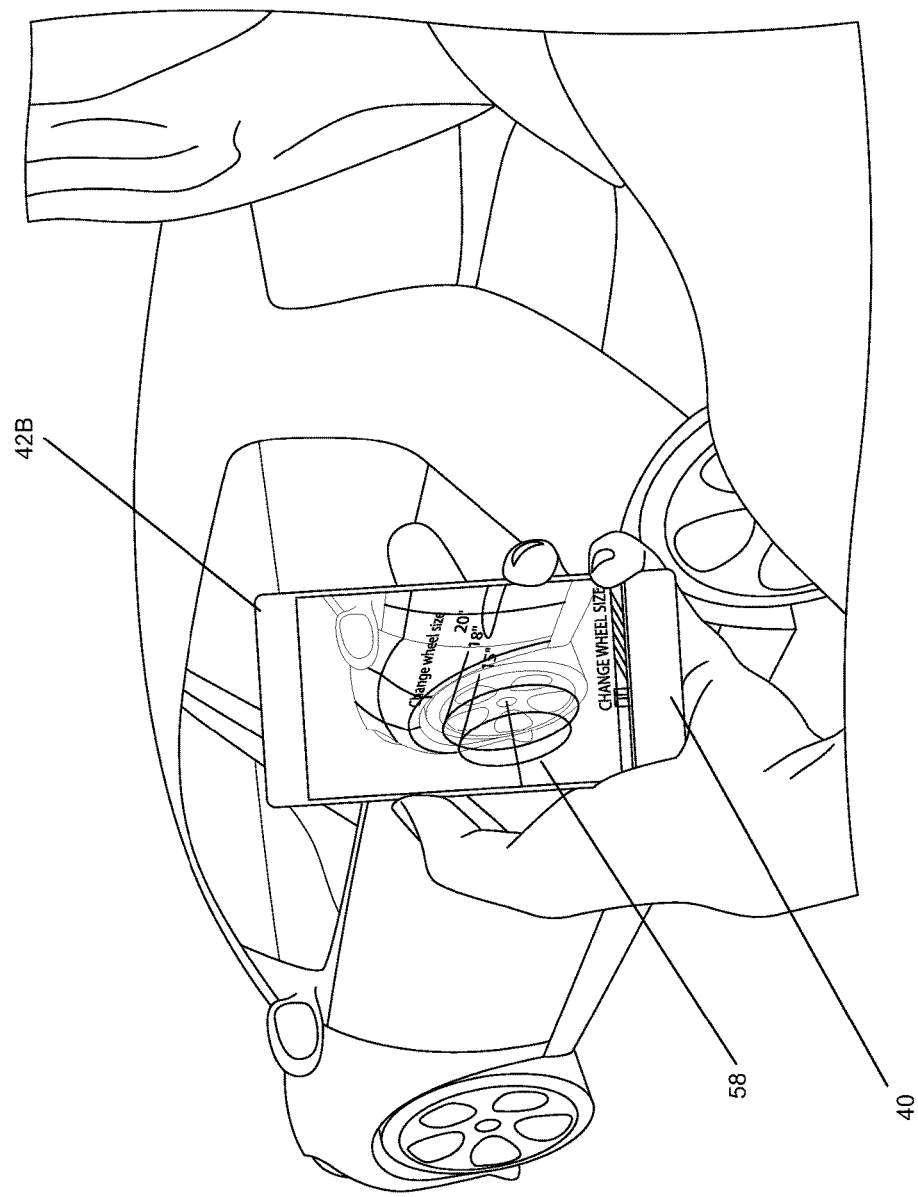
FIG. 11 is a depiction of the use of the tracking core paired with a smartphone.

FIG. 11 is a depiction of the use of the tracking core 40 paired with a smartphone host device 42B. In this way, the HMD device 20, with knowledge of the smartphone's orientation, may replace the screen of the smartphone with a new overlaid digital image 58. In FIG. 11, the smartphone screen is overlaid with an augmented view of the scene as detected by the HMD device 20. Additional digital images are added to the wheel well of the car in view of the user. In the example application, a user is able to alter the wheels on the car on the pseudo-screen of the smartphone 42B.

Figure 12:
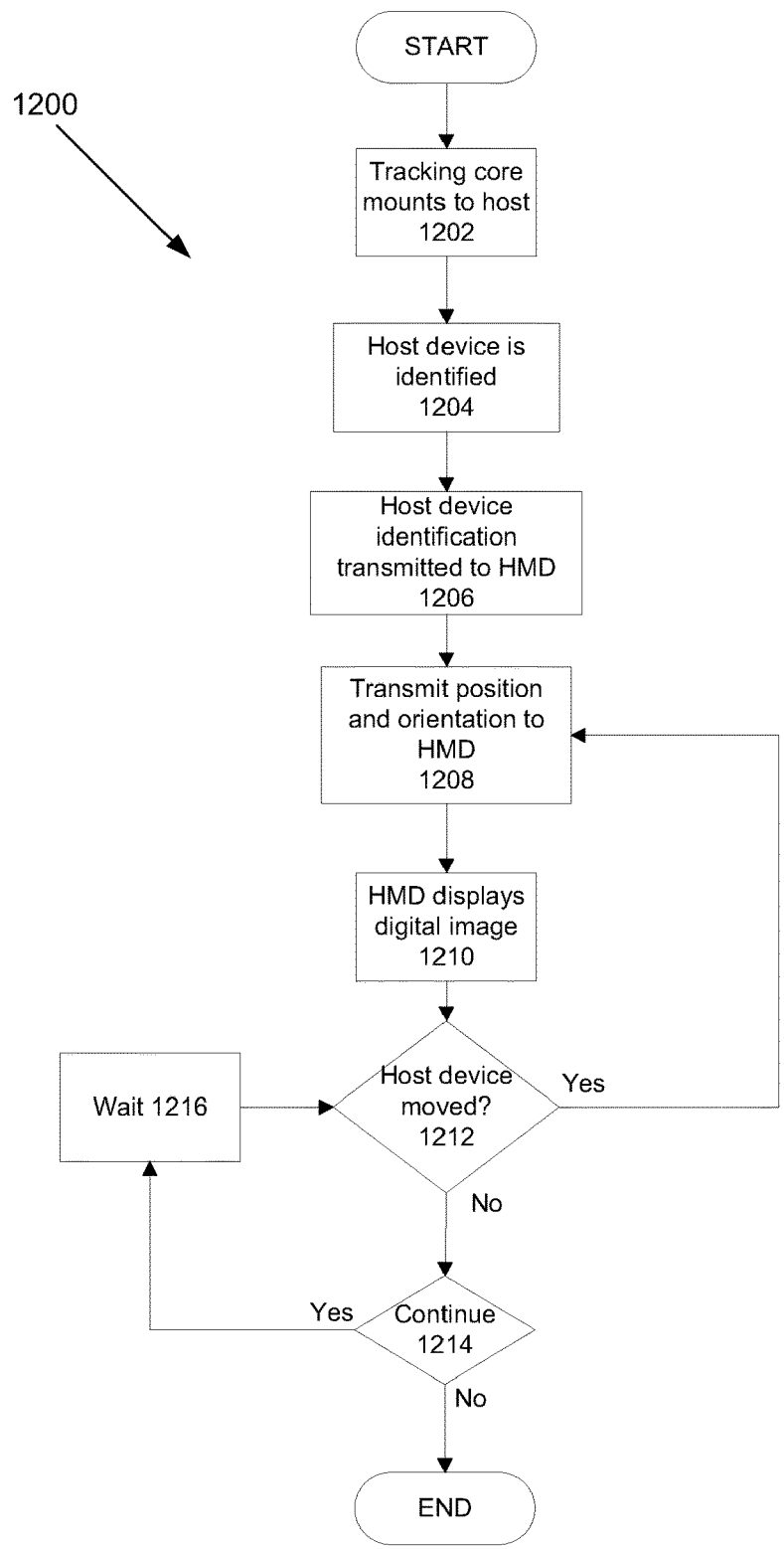
FIG. 12 is a flow chart illustrating an example of a process of peripheral orientation tracking.

FIG. 12 is a flow chart illustrating peripheral orientation tracking. In step 1202, the tracking core mounts to a host device. Mounting may be external, or internal to the host device. The tracking core mount may include means of physical force fit, clamps, magnets, locking mechanisms, plug in adapters (such as a USB), or other suitable means known in the art. In step 1204, the host device is identified. The tracking core or the host device may perform this step. When performed by the tracking core, the tracking core receives a specification file from the host device, or scans the host device via external optical sensors. The tracking core may scan for a barcode or machine-readable code. Alternatively, the tracking core may obtain an image of the host device and recognize the host device via computer vision techniques. In step 1206, the host device identification/specification is transmitted to the HMD device. Either the tracking core or the host device performs this step based on whichever has a wireless connection with the HMD device.

In step 1208, the device with the wireless connection to the HMD device (either the tracking core or the host device) transmits positional and orientation data of the host device as detected by the tracking core. In step 1210, the HMD displays a digital image to the user based on the positioning of the host device and tracking core. The digital image may be holographic or virtual depending on the environment created by the HMD device. In some embodiments, the digital image is in a fixed position relative to the host device (e.g., light saber blade). In some embodiments, the digital image is generated via user input as created via the positional and orientation data received from the tracking core (e.g., drawn by a stylus).

In step 1212, the tracking core determines whether it (and the host device) has moved. Where the tracking core has moved, the method returns to step 1208, and the HMD device is updated on the location. If the tracking core does not detect movement, the method progresses to step 1214. In step 1214, where the tracking core continues to operate, the method proceeds to step 1216. In step 1216, the tracking core waits a predetermined time (as determined by power consumption settings) and returns to step 1212 to evaluate whether or not it has moved from the last recorded position.

An Example Machine Overview

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Figure 13:
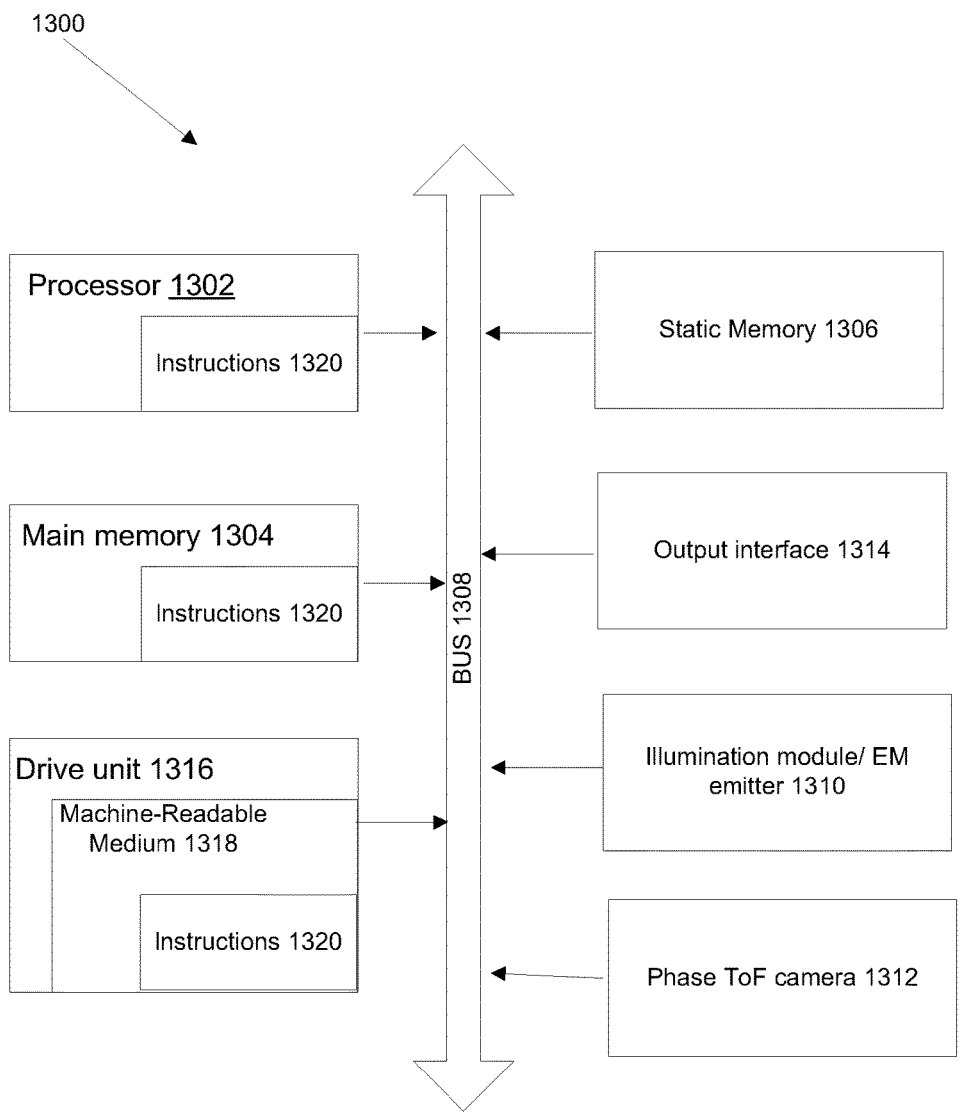
FIG. 13 is a block diagram showing an example of various functional components of an HMD device.

FIG. 13 is a block schematic diagram of a system in the exemplary form of a computer system 1300 within which a set of instructions for causing the system to perform any one of the foregoing methodologies and logical flows may be executed. In alternative embodiments.

The computer system 1300 includes a processor 1302, a main memory 1304 and a static memory 1306, which communicate with each other via a bus 1308. The computer system 1300 further includes an illumination module 1310 and a phase time of flight camera 1312. The computer system 1300 also includes an output interface 1314, for example, a USB interface, a network interface, or electrical signal connections and/or contacts;

The disk drive unit 1316 includes a machine-readable medium 1318 on which is stored a set of executable instructions, i.e., software 1320, embodying any one, or all, of the methodologies described herein. The software 1320 is also shown to reside, completely or at least partially, within the main memory 1304 and/or within the processor 1302. The software 1320 may further be transmitted or received over a network by means of a network interface device 1314.

In contrast to the system 1300 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, for example, requiring a consultant to install. For example, embodiments may provide one or more cloud computing solutions that enable users, for example, users on the go, to access real-time video delivery on such internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

Examples of Certain Embodiments

Certain embodiments of the technology introduced herein are summarized in the following numbered examples:

1. A device comprising: a tracking core configured to generate tracking data for the device in six degrees of freedom and physically mount to and establish a communication link to a host device; a controller configured to determine an identity of the host device via the communication link; and a communication interface configured to communicate the tracking data and information indicative of the identity of the host device to a processing device other than the host device.

2. The device of example 1, wherein the processing device is a head mounted display (HMD) device.

3. The device of any of examples 1 to 2, wherein the tracking core is configured to generate tracking data in six degrees of freedom relative to the HMD.

4. The device of any of examples 1 to 3, wherein the communication interface is configured to receive input data from the processing device and the controller is further configured to communicate the input data to the host device via the communication interface.

5. The device of any of examples 1 to 4, wherein the information indicative of the identity of the host device identifies physical form factor characteristics of the host device.

6. The device of any of examples 1 to 5, wherein the host device is any of: a smartphone or tablet; a game system controller; a stylus; a wearable accessory; heavy equipment; or a peripheral toy.

7. The device of any of examples 1 to 6, the HMD being further configured to: display a holographic image to a user based on the tracking data received from the device, such that the holographic image appears to the user in a position relative to the host device determined based on a position or orientation of the host device.

8. A method comprising: generating, by an input device, tracking data for the input device in six degrees of freedom while the input device is physically mounted on a host device; establishing, by the input device, a communication link to a host device; determining, by the input device via the communication link, an identity for the host device; and wirelessly communicating, by the input device, the tracking data and information indicative of the identity of the host device to a processing device other than the host device.

9. The method of example 8, wherein the external processing device is a head mounted display (HMD) device.

10. The method of any of examples 8 to 9, wherein the input device generates tracking data in six degrees of freedom relative to the HMD.

11. The method of any of examples 8 to 10, said wirelessly communicating further comprising: receiving, by the input device, input data from the processing device; and transmitting, by the input device, the input data to the host device.

12. The method of any of examples 8 to 11, wherein the information indicative of the identity of the host device identifies physical form factor characteristics of the host device.

13. The method of any of examples 8 to 12, further comprising: displaying, by the HMD device, a holographic image to a user based on the tracking data received from the input device, the holographic image appearing to the user in a position relative to the host device determined based on a position or orientation of the host device.

14. The method of any of examples 8 to 13, further comprising: receiving, by the HMD device, user input with respect to the holographic image; and updating the holographic image based on the user input.

15. A method comprising: receiving, by a head mounted display (HMD) device, a characteristic associated with a host device, the characteristic including a physical form factor of the host device; receiving, by the HMD device, spatial tracking data for six degrees of freedom, from a tracking device that is physically attached to the host device; displaying, by the HMD device, an image to a user based on the spatial tracking data received from the tracking device, the image appearing to the user in a position relative to the host device determined based on a position or orientation of the host device.

16. The method of example 15, further comprising: receiving, by the HMD device, user input with respect to the image; and updating the image based on the user input.

17. The method of any of examples 15 to 16, wherein the position of the image is further determined by the characteristic about the host device.

18. The method of any of examples 15 to 17, further comprising: detecting, by the HMD device, that the image appears to the user as making contact with an object other than the host device; and generating a holographic effect based on said appearance of contact.

19. The method of any of examples 15 to 18, wherein the spatial tracking data of the tracking device is received as a relative position of the tracking device to the HMD device.

20. The method of any of examples 15 to 19, further comprising: transmitting, by the HMD device, application data to the tracking device; and transmitting, by the tracking device, the application data to the host device.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The invention claimed is:

1. A device configured to physically mount to a host device, the device comprising:
 a tracking core configured to generate tracking data for the device in six degrees of freedom and establish a communication link to a host device;
 the tracking core further comprising:
  a processor configured to determine an identity of the host device via the communication link; and
  a communication interface configured to communicate the tracking data and information indicative of the identity of the host device to a processing device other than the host device over a first connection, with the processing device, that does not include the host device and is different from a second connection between the host device and the processing device.

2. The device of claim 1, wherein the processing device is a head mounted display (HMD) device.

3. The device of claim 2, wherein the tracking core is configured to generate tracking data in six degrees of freedom relative to the HMD.

4. The device of claim 1, wherein the communication interface is configured to receive input data from the processing device and the processor is further configured to communicate the input data to the host device via the communication interface.

5. The device of claim 1, wherein the information indicative of the identity of the host device identifies physical form factor characteristics of the host device.

6. The device of claim 1, wherein the host device is any of:
 a smartphone or tablet;
 a game system controller;
 a stylus;
 a wearable accessory;
 heavy equipment; or
 a peripheral toy.

7. The device of claim 2, the HMD being further configured to:
 display a holographic image to a user based on the tracking data received from the device, such that the holographic image appears to the user in a position relative to the host device determined based on a position or orientation of the host device.

8. A method comprising:
 generating, by an input device physically mounted on a host device, tracking data for the input device in six degrees of freedom;
 establishing, by the input device, a communication link to a host device;
 determining, by the input device via the communication link, an identity for the host device; and
 wirelessly communicating, by the input device, the tracking data and information indicative of the identity of the host device to a processing device other than the host device over a first connection, with the processing device, that does not include the host device and is different from a second connection between the host device and the processing device.

9. The method of claim 8, wherein the external processing device is a head mounted display (HMD) device.

10. The method of claim 9, wherein the input device generates tracking data in six degrees of freedom relative to the HMD.

11. The method of claim 8, said wirelessly communicating further comprising:
 receiving, by the input device, input data from the processing device; and
 transmitting, by the input device, the input data to the host device.

12. The method of claim 8, wherein the information indicative of the identity of the host device identifies physical form factor characteristics of the host device.

13. The method of claim 9, further comprising:
 displaying, by the HMD device, a holographic image to a user based on the tracking data received from the input device, the holographic image appearing to the user in a position relative to the host device determined based on a position or orientation of the host device.

14. The method of claim 13, further comprising:
 receiving, by the HMD device, user input with respect to the holographic image; and
 updating the holographic image based on the user input.

* * * * *